(12) United States Patent
Puar et al.

(10) Patent No.: US 7,106,619 B2
(45) Date of Patent: *Sep. 12, 2006

(54) GRAPHICS CONTROLLER INTEGRATED CIRCUIT WITHOUT MEMORY INTERFACE

(75) Inventors: Deepraj S. Puar, Sunnyvale, CA (US); Ravi Ranganathan, Cupertino, CA (US)

(73) Assignee: Neomagic Corporation, Santa Clara, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/908,259

(22) Filed: May 4, 2005

(65) Prior Publication Data

US 2005/0180225 A1 Aug. 18, 2005

Related U.S. Application Data

(60) Division of application No. 10/803,783, filed on Mar. 18, 2004, now Pat. No. 6,920,077, which is a division of application No. 10/042,952, filed on Jan. 7, 2002, now Pat. No. 6,771,532, which is a continuation of application No. 09/467,942, filed on Dec. 21, 1999, now Pat. No. 6,356,497, which is a continuation of application No. 08/883,538, filed on Jun. 26, 1997, now Pat. No. 6,041,010, which is a continuation of application No. 08/581,086, filed on Dec. 29, 1995, now abandoned, which is a division of application No. 08/262,412, filed on Jun. 20, 1994, now abandoned.

(51) Int. Cl.
*G11C 11/24* (2006.01)

(52) U.S. Cl. .................. 365/149; 365/156; 365/189.09

(58) Field of Classification Search ................ 365/226, 365/149, 156, 189.09, 189.08
See application file for complete search history.

(56) References Cited

U.S. PATENT DOCUMENTS

| 4,191,956 A | 3/1980 | Groothuis |
| 4,228,528 A | 10/1980 | Cenker |
| 4,303,986 A | 12/1981 | Lans |

(Continued)

FOREIGN PATENT DOCUMENTS

DE 3 628 286 2/1988

(Continued)

OTHER PUBLICATIONS

K. Sato et al, "A Water-Scale-Level Systems Integrated LSI Containing Eleven 4-Mb DRAMs rams six 64-kb SRAMs and an 18K-Gate Array", IEEE Journal of Solid State Circuits, vol. 27, No. 11, Nov. 1992.

(Continued)

*Primary Examiner*—Richard Elms
*Assistant Examiner*—Hien N Nguyen
(74) *Attorney, Agent, or Firm*—Aka Chan LLP

(57) ABSTRACT

A graphics controller system which has a graphics engine and video memory together with some interface blocks, a PCMCIA host adapter, an infrared interface for generating video images on a LCD or CRT display unit, and a video stream interface for receiving video signals, all in the form of a CMOS integrated circuit. The video memory is integrated on the same integrated circuit as the graphics controller; no package pins are required for the memory interface. Simultaneous performance improvement and power dissipation reduction is achieved because of the wide memory interface and the elimination of the large parasitic capacitances associated with a package pin connection.

40 Claims, 6 Drawing Sheets

U.S. PATENT DOCUMENTS

| | | | |
|---|---|---|---|
| 4,330,849 A | 5/1982 | Togei et al. | |
| 4,472,792 A | 9/1984 | Shimohigashi et al. | |
| 4,656,605 A | 4/1987 | Clayton | |
| 4,691,295 A | 9/1987 | Erwin | |
| 4,740,782 A | 4/1988 | Aoki et al. | |
| 4,812,836 A | 3/1989 | Kurakake et al. | |
| 4,816,815 A | 3/1989 | Yoshiba | |
| 4,951,232 A | 8/1990 | Hannah | |
| 4,956,708 A | 9/1990 | Itagaki | |
| 5,027,212 A | 6/1991 | Marlton et al. | |
| 5,031,092 A | 7/1991 | Edwards et al. | |
| 5,083,047 A | 1/1992 | Horie | |
| 5,083,294 A | 1/1992 | Okajima | |
| 5,144,223 A | 9/1992 | Gillingham | |
| 5,170,154 A | 12/1992 | Mantopoulos | |
| 5,198,708 A | 3/1993 | Gillingham | |
| 5,202,962 A | 4/1993 | Matsuo et al. | |
| 5,218,674 A | 6/1993 | Peaslee et al. | |
| 5,258,843 A | 11/1993 | Truong | |
| 5,265,203 A | 11/1993 | Peaslee et al. | |
| 5,267,201 A | 11/1993 | Foss et al. | |
| 5,276,798 A | 1/1994 | Peaslee et al. | |
| 5,283,761 A | 2/1994 | Gillingham | |
| 5,293,540 A | 3/1994 | Trani et al. | |
| 5,293,586 A | 3/1994 | Yamazaki et al. | |
| 5,297,148 A | 3/1994 | Harari et al. | |
| 5,303,334 A | 4/1994 | Snyder et al. | |
| 5,305,283 A | 4/1994 | Shimokura et al. | |
| 5,319,388 A | 6/1994 | Mattison et al. | |
| 5,321,806 A | 6/1994 | Meinerth et al. | |
| 5,323,343 A | 6/1994 | Ogoh | |
| 5,353,402 A | 10/1994 | Lau | |
| 5,363,500 A | 11/1994 | Takeda | |
| 5,386,573 A | 1/1995 | Okamoto | |
| 5,392,393 A | 2/1995 | Deering | |
| 5,396,586 A | 3/1995 | Van Aken | |
| 5,406,523 A | 4/1995 | Foss et al. | |
| 5,414,662 A | 5/1995 | Foss et al. | |
| 5,434,969 A | 7/1995 | Heilveil | |
| 5,442,748 A | 8/1995 | Chang et al. | |
| 5,448,733 A | 9/1995 | Satoh et al. | |
| 5,469,401 A | 11/1995 | Gillingham | |
| 5,473,573 A | 12/1995 | Rao | |
| 5,537,128 A | 7/1996 | Keene et al. | |
| 5,650,955 A * | 7/1997 | Puar et al. | 365/51 |
| 5,694,143 A | 12/1997 | Fielder et al. | |
| 5,703,806 A * | 12/1997 | Puar et al. | 365/181 |
| 5,712,664 A | 1/1998 | Reddy | |
| 5,790,839 A | 8/1998 | Luk et al. | |
| 6,041,010 A | 3/2000 | Puar et al. | |
| 6,346,946 B1 | 2/2002 | Jeddeloh | |
| 6,356,497 B1 | 3/2002 | Puar et al. | |
| 6,424,658 B1 | 7/2002 | Mathur | |
| 6,480,199 B1 | 11/2002 | Oomori et al. | |
| 6,771,532 B1 * | 8/2004 | Puar et al. | 365/149 |

FOREIGN PATENT DOCUMENTS

| | | |
|---|---|---|
| GB | 2 217 066 | 10/1987 |
| GB | 2 208 344 | 3/1989 |
| GB | 0 269 049 | 1/1994 |
| JP | 01-271766 | 10/1989 |
| JP | 04-134396 | 5/1992 |
| JP | 4-211293 | 8/1992 |
| WO | WO 0 165 441 | 12/1985 |
| WO | WO 0 260 578 | 3/1988 |
| WO | WO 0 334 524 | 9/1989 |
| WO | WO 0 383 080 | 8/1990 |
| WO | WO 0 474 366 | 3/1992 |
| WO | WO 0 492 840 | 7/1992 |
| WO | WO 0 547 892 | 6/1993 |

OTHER PUBLICATIONS

Y. Fujita et al., "IMAP: Integrated Memory Array Processor—Toward a GIPS Order SIMD Processing LSI", IEICE Transactions on Electronics, vol. #76—C, No. 7, Jul. 1993.

IBM Technical Disclosure Bulletin, 35(1A):45-46, Jun. 1992.

NEC Research and Development, vol. 33, No. 4, Oct. 1992, Tokyo, Japan, pp. 585-594, "Integrated Memory Array Processor".

IEEE Journal of Solid-State Circuits, vol. 25, No. 1, Feb. 1990, N.Y., pp. 30-35, "A 50 MHz 8 Mbit Vidoe Ram with a Column Direction Drive Sense Amplifier".

* cited by examiner

GRAPHICS CONTROLLER INTEGRATED CIRCUIT WITHOUT MEMORY INTERFACE

CROSS-REFERENCE TO RELATED APPLICATIONS

This is a divisional application of U.S. patent application Ser. No. 10/803,783, filed Mar. 18, 2004, now U.S. Pat. No. 6,920,077, which is a divisional patent application of U.S. patent application Ser. No. 10/042,952, filed Jan. 7, 2002, now U.S. Pat. No. 6,771,532 issued Aug. 3, 2004, which is a continuation of U.S. patent application Ser. No. 09/467,942, filed Dec. 21, 1999 (now U.S. Pat. No. 6,356,497, issued Mar. 12, 2002), which is a continuation of U.S. patent application Ser. No. 08/883,538, filed Jun. 26, 1997 (now U.S. Pat. No. 6,041,010, issued Mar. 21, 2000), which is a continuation of U.S. patent application Ser. No. 08/581,086, filed Dec. 29, 1995 (abandoned) which is a divisional application of U.S. patent application Ser. No. 08/262,412, filed Jun. 20, 1994 (abandoned), all of which are incorporated herein by reference in their entirety.

BACKGROUND OF THE INVENTION

This invention is related to graphics controller systems and, more particularly, to graphics controller systems with low power dissipation.

As shown in FIG. 1, a typical graphics controller system has a graphics controller integrated circuit 10, which has a graphics engine 12 for manipulating video data, and a CPU interface 13, display interface 14 and video memory interface 15. The graphics controller integrated circuit 10 receives video image data from a CPU (central processing unit) through the CPU interface 13, and after processing the data, stores that information through the video memory interface 15 in a separate video memory 11, also called the video frame buffer. The graphics controller 10 also makes sure that the image data is regularly retrieved from the video memory (through the interface 15) and fed to a display unit through the display interface 14 with a frequency which satisfies the refresh requirements of the display. In some more advanced graphics controller systems, video image data may also be received from other sources, such as a device with a PCMCIA (Personal Computer Memory Card International Association) connector.

The video memory interface 15 of the graphics controller integrated circuit 10 has ports dedicated to interface with the video memory 11. The number of ports required for this interface 15 is the sum of the address, data and control signals required to access the video memory 11. The memory 111 has a size which is a function of the video frame buffer required to support the display resolution. While dynamic random access memory (DRAM) is most commonly used for the video frame buffer, some high performance systems use VRAMs (DRAMs with serial data ports added). A typical VGA (Video Graphics Adapter standard) display in an IBM-compatible mobile computer, often called a notebook computer, with an LCD (liquid crystal display) panel uses a single 256K×16 DRAM integrated circuit as a video frame buffer. A typical SVGA (Super VGA standard) system uses two such DRAMs organized as 256K×32.

Wider data paths between the video memory and the graphics controller allow greater bandwidth for data transfer. However, the wider data paths also increase the pin count of the graphics controller package and the package count of the DRAMs with the accompanying increased manufacturing complexity and costs. A 16-bit data path requires one DRAM package and approximately 30 signal lines to handle the memory address, data, and control signals, while a 32-bit data path requires two DRAM packages and 50 signal lines. Power dissipation is increased as more signal lines are added since each signal line has a parasitic capacitance associated with the package I/O pin, as well as with the conducting trace on the motherboard of the mobile computer system. Therefore, an increase in graphics performance is accompanied by an increase in power dissipation, pin count and package count.

The present invention solves or substantially mitigates these problems with a high performance graphics controller system having low power dissipation, and low pin and package counts.

SUMMARY OF THE INVENTION

According to the invention, there is provided a graphics controller system with increased performance simultaneously with a reduction in power dissipation, point count and package count. Previously external video memory is integrated with the graphics controller system to eliminate the memory interface. The reduction in pin count is used to add the pins associated with a PCMCIA host adapter and thus allow the integration of that function on the same chip, so as to further reduce the package count on the mother board.

The present invention also provides for particular arrangements for logic circuits and output buffer circuits so that large amounts of logic circuitry sufficient to perform graphics controller system functions may be integrated with the large amounts of memory sufficient to act as a high performance video memory. Furthermore, the present invention provides for a wide bus between the integrated video memory and the functional blocks of the graphics controller system. The present invention has circuits in these blocks for manipulating the video data from the wide bus so that data transfer remains compatible to the various operational VGA modes.

DESCRIPTION OF THE SPECIFIC EMBODIMENTS

Figure 1:
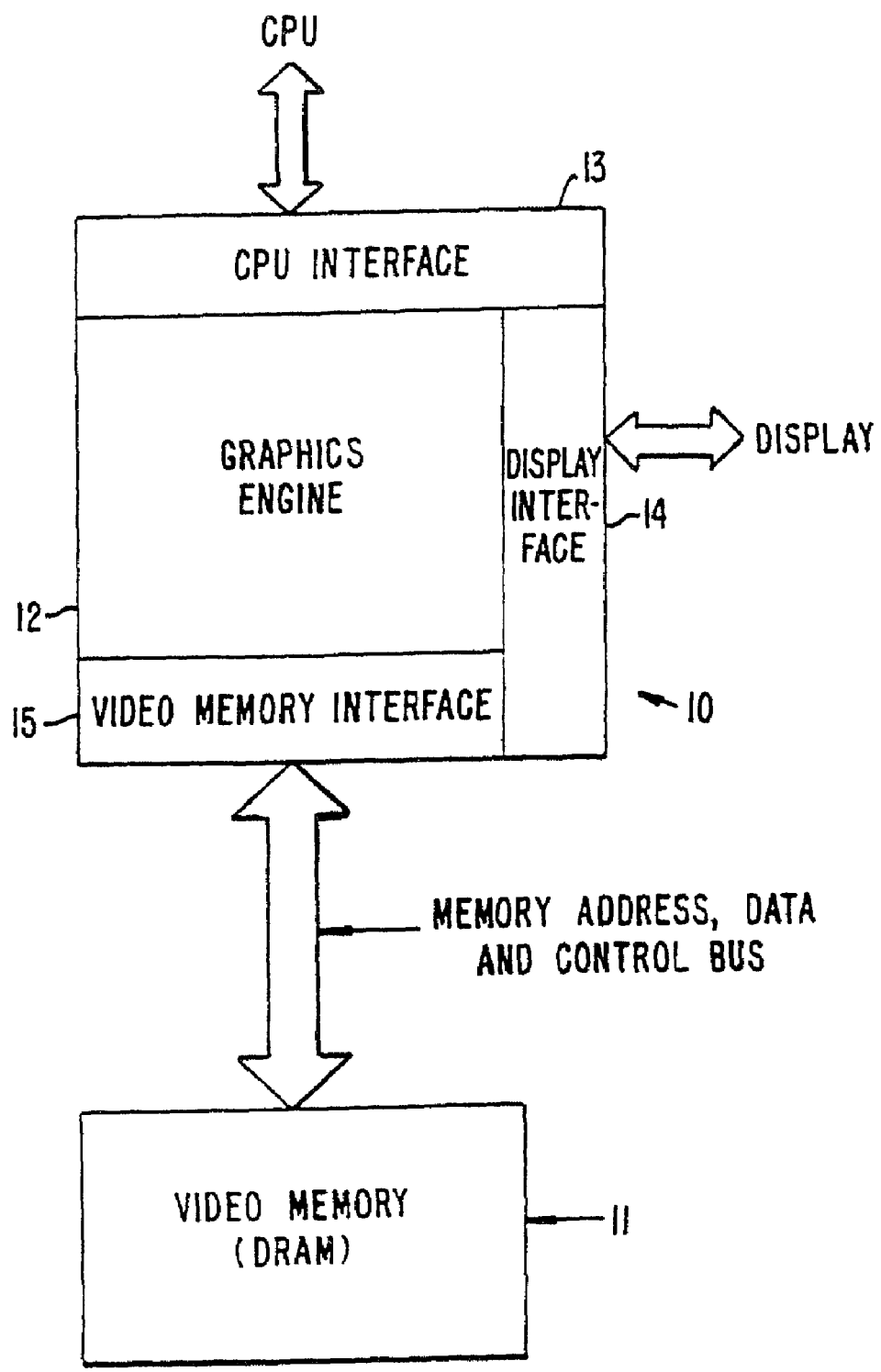
FIG. 1 illustrates the general organization of a graphics controller system in the prior art.
Figure 2:
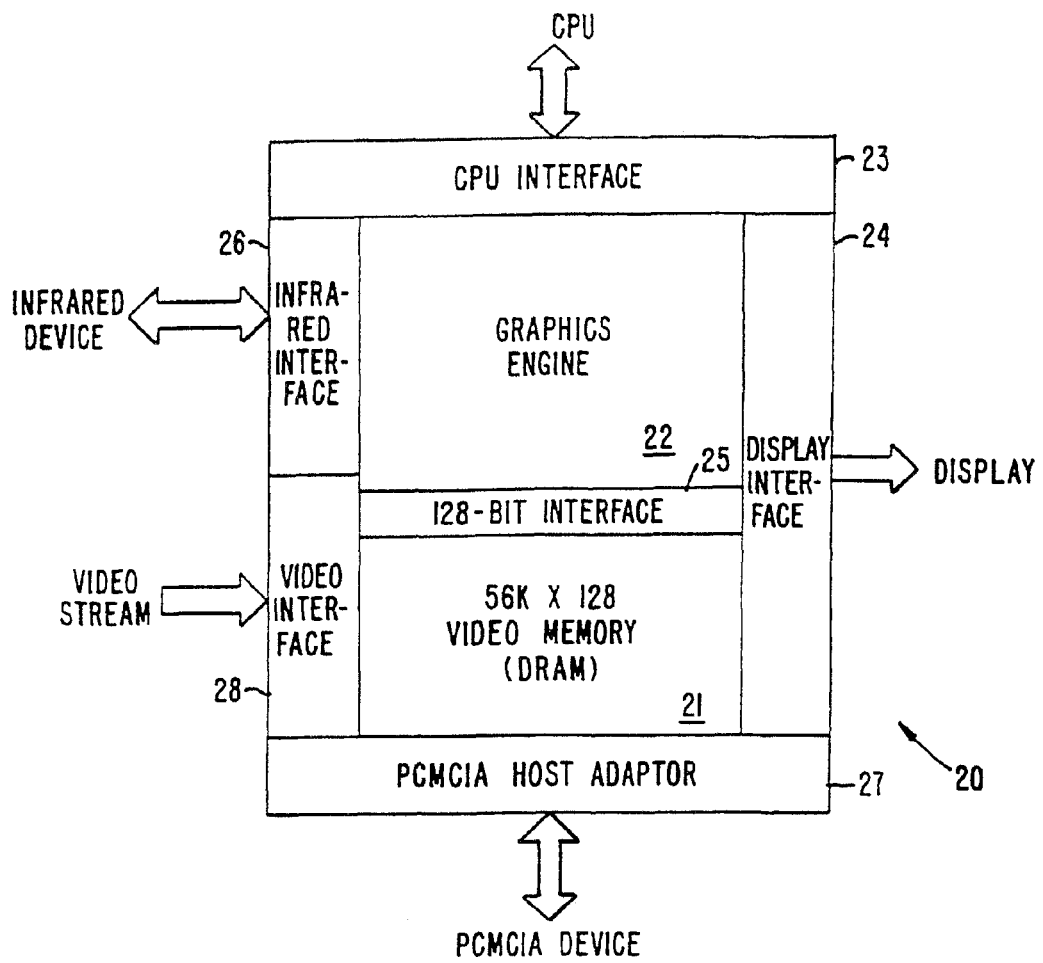
FIG. 2 illustrates the general organization of a graphics controller integrated circuit according to the present invention.

In accordance with the present invention, the graphics controller functions are integrated on the same integrated circuit substrate as the video memory, as shown in FIG. 2. A single integrated circuit 20 has a portion of its substrate for an advanced graphics engine 22, the circuitry which handles the graphics controller functions and manipulates the video data. The integrated circuit 20 also has another portion of the substrate for a video memory 21, in the form of a DRAM. A 128-bit wide data interface 25 connects the graphics engine 22 and the DRAM 21. The DRAM has 7.3 megabits, organized as 56K×128 bits. In every memory cycle, 128 bits are accessed which can then be multiplexed down to the required number of bits for communication to the CPU through a CPU interface 23 or to the display through a display interface 24.

The integrated circuit 20 also has other interfaces, such as an infrared interface 26 for wireless transmission of data between the mobile computer and another device, a PCMCIA host adaptor interface 27 for connections to devices, such as modems, hard disks, etc., which are designed to meet the PCMCIA specification, and a video stream interface 28 for receiving video signals from a variety of sources, such as television or VCR signals. The video stream interface 28 is adapted to the VAFC (VESA Advanced Feature Connector) standards being promulgated by the Video Electronics Standards Association (VESA).

Integrating a large block of DRAM (approximately 7 megabits) on the same substrate with a large block of logic (approximately 40K to 50K of logic gates) required for the graphics engine 22 and various interfaces is not simply a matter of placing DRAM and logic circuits on the same integrated circuit substrate. The optimum technologies for a DRAM and for a logic circuit are electrically incompatible. Hence various steps, described below, must be taken to ensure that the performance of the DRAM circuits and the logic circuits are fully maintained and not compromised.

An integrated circuit process used for building logic gates uses one of the external supply voltages ($V_{DD}$ or $V_{SS}$ depending upon the substrate type) as the voltage to bias the substrate. On the other hand, an integrated circuit process used for building a DRAM uses an internally generated substrate bias voltage which is different from the external supply voltages. This is done primarily to lower the junction capacitance of the memory cell bit lines of the DRAM, as well as to improve the memory cell refresh time.

Figure 3A:
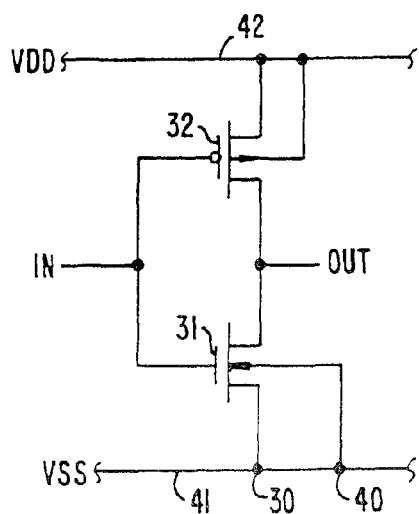
FIG. 3A is a circuit diagram of a CMOS logic inverter as connected in a prior art integrated circuit manufactured according to a logic process.

For example, in commonly used CMOS technology today, the substrate material is P-type silicon. A logic process uses the externally supplied $V_{SS}$, or ground, voltage to connect to the substrate. The $V_{SS}$ line is also used in the circuit areas to provide the ground path for current flow in the pulldown, N-channel transistors in the logic circuits. FIG. 3A illustrates this point with a representative logic gate, an inverter having a pull-down, N-channel transistor 31 and a pull-up, P-channel transistor 32. The PMOS transistor 32 has its source connected to a metal line 42 at the positive supply voltage, $V_{DD}$, and the NMOS transistor 31 has its source connected to a metal line 41 at $V_{SS}$. The P-type substrate in which the NMOS transistor is placed is also connected to the $V_{SS}$ line 41. In FIG. 3A (and 3B and 4), node 30 represents a metal-to-N+ source contact and node 40 represents a metal-to-P+ substrate contact.

Thus the same $V_{SS}$ metal tracks in the logic integrated circuit serves two functions: 1) as a substrate tap every 25–50 microns across the substrate surface, and 2) as a source terminal of the N-channel transistors of the logic circuits. The substrate taps are necessary to protect the circuits from going into a latch-up condition during operation, since each logic gate has both N-type and P-type transistors.

In a CMOS DRAM, however, the typical DRAM array is built with only N-type transistors and capacitors, and a major goal is to minimize the parasitic capacitance of the memory bit line. Since the N-type bit line junction areas contribute to a majority of the bit line capacitance and since the junction capacitance is greatly reduced by a reverse junction bias voltage, the P-type substrate is typically biased at −1.5 volts, termed $V_{BB}$. This voltage is generated from an on-chip charge pump and thus has a limited capacity and a high output impedance. This results in the substrate voltage being relatively "noisy" due to the precharging and discharging of the large junction areas associated with the memory array, that are capacitively coupled to the substrate.

Figure 3B:
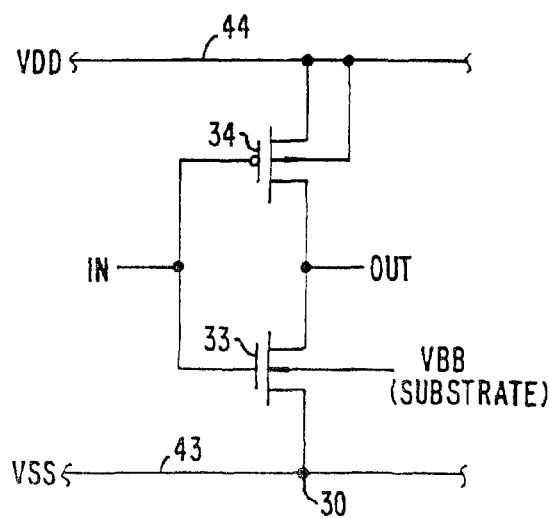
FIG. 3B is a circuit diagram of a CMOS logic inverter as connected in a prior art integrated circuit manufactured according to a DRAM process.

In the DRAM, the small amount of on-chip logic which handles the memory address decoding and the data read and write functions typically uses the $V_{SS}$ metal tracks only to connect to the source terminal of the N-channel, pulldown transistors and not as a substrate tap. As shown by a representative logic gate, an inverter, in FIG. 3B, a pull-down, N-channel transistor 33 has its source connected to a $V_{SS}$ metal line 43. The P-type substrate of the NMOS transistor 33 is at $V_{BB}$.

In fact, DRAMs typically do not have any substrate taps in the middle of the circuitry. The substrate taps are only made at the edges of the die. Since most of the logic blocks in a DRAM consist of a few cells, repeated many times, which together form a small portion of the total chip area, large P-to-N diffusion spacings, typically 25 microns, can be maintained in the logic cells to avoid latch-up. In contrast, in a logic circuit, which has many different cell types connected in a relatively random manner, the cell size is very important as it determines the total chip area. The P-to-N diffusion spacings are minimized, typically 5 microns, which requires the use of substrate taps in every cell to avoid latch-up.

Figure 4:
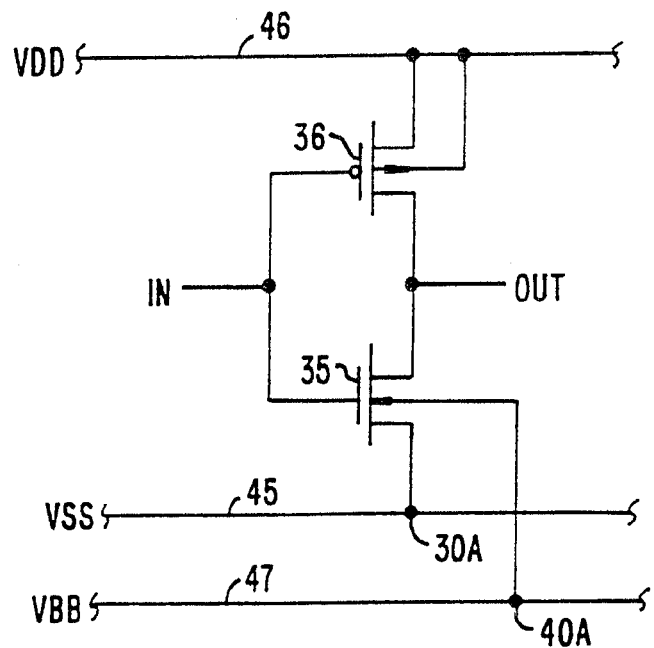
FIG. 4 is a circuit diagram of a CMOS logic inverter as connected according to the present invention in an integrated circuit manufactured according to a DRAM process.

To combine a significant amount of random logic to a significant amount of DRAM in a single integrated circuit requires that this problem be overcome. The present invention combines the random logic, the graphics engine 12 and interfaces, with the DRAM 11, in an integrated circuit 20 manufactured in accordance with a DRAM process. The logic circuits of the integrated circuit are redesigned to decouple the $V_{SS}$ line connected to the source terminals of the N-channel, pulldown transistors from the P-substrate tap. As shown in FIG. 4, the source of the N-channel, pulldown transistor 35 of a representational logic circuit is connected to a $V_{SS}$ line 45 (at 0 volts), while the substrate is tapped by a $V_{BB}$ line 47 (at −1.5 volts). The P-to-N diffusion spacings are then minimized without deleterious consequences.

Figure 5:
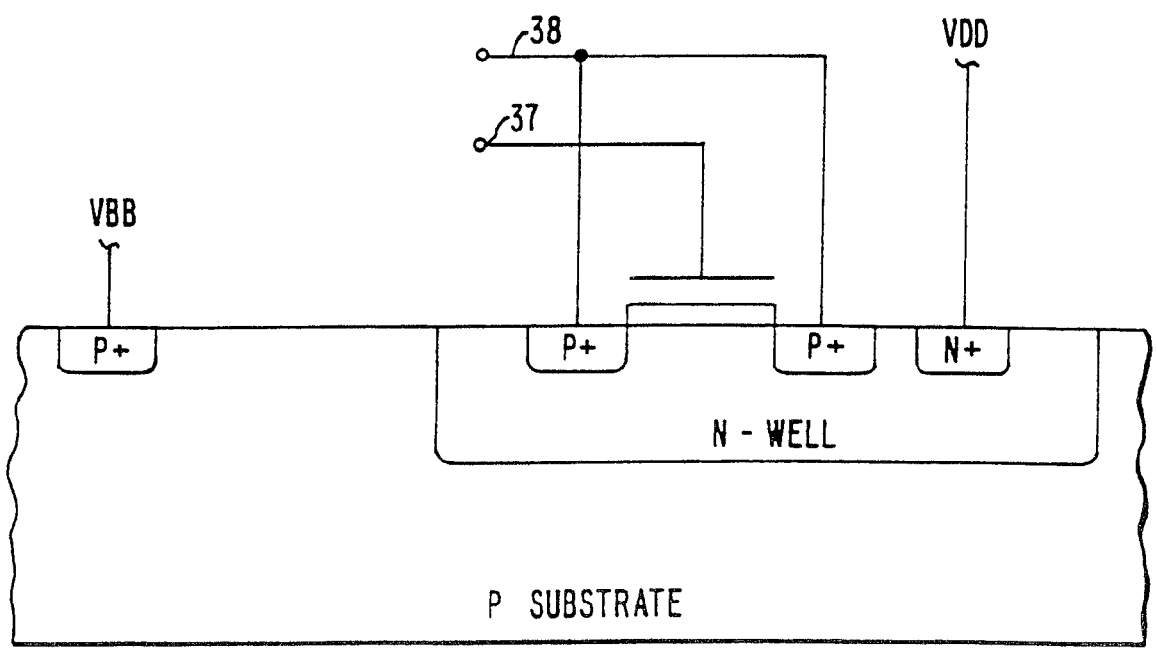
FIG. 5 is a cross-sectional diagram of a P-channel transistor in an N-type well, which form most of the analog circuits in the graphics controller portion of the integrated circuit shown in FIG. 2.

Additionally, the graphics engine 22 of the integrated circuit 20 has analog circuits. In an exemplary analog circuit, a low-pass filter is often used and an RC circuit is required. Heretofore, the capacitor of the RC circuit has been typically formed by an NMOS transistor with its gate forming one terminal and the shorted source/drains forming the other terminal of the capacitor. Since the body bias of this transistor is the noisy substrate voltage generated from the on-chip charge pump required for the DRAM 21, some of the noise couples inevitably into the low-pass filter circuit. To avoid this problem, the analog circuits according to the present invention are designed with mostly P-channel transistors within independent N-wells which are connected to the positive and relatively quiet reference voltage, $V_{DD}$, as shown in FIG. 5. The N-wells isolate the terminals 37 and 38 of the capacitors and the rest of the analog circuits from the "noisy" substrate voltage.

Figure 6A:
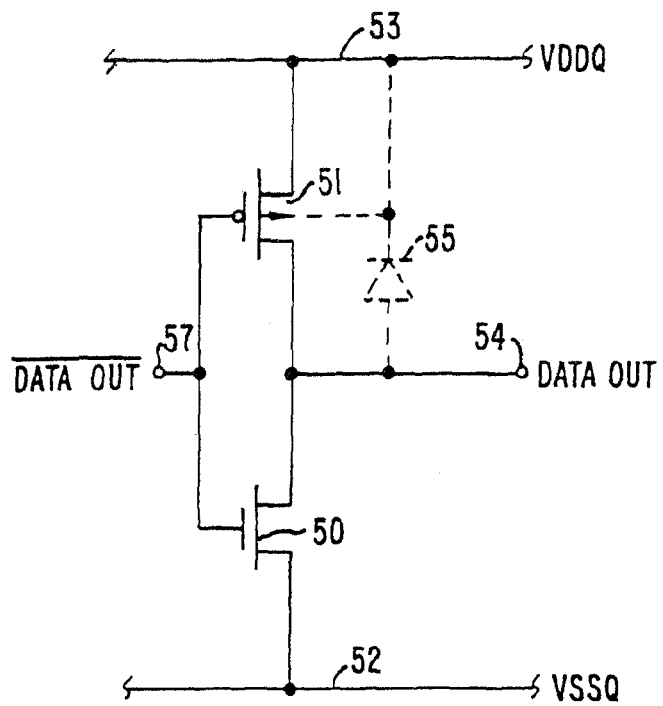
FIG. 6A is a circuit diagram of a CMOS driver stage of an output buffer found in the prior art.

On the periphery of the integrated circuit are buffer circuits for transferring signals to and from the external world. Problems arise with the DRAM technology in the driver stage circuit of each output buffer. Shown in FIG. 6A is a representative output driver stage found in the prior art. Basically an inverter, the driver stage has two transistors, an N-channel, pulldown, driver transistor 50 having its source connected to a voltage supply bus 52 at an external negative supply voltage, $V_{SSQ}$, and a P-channel, pullup, driver transistor 51 having its source connected to a voltage supply bus 53 at an external positive supply voltage, $V_{DDQ}$. The words, "negative" and "positive," refer to one supply voltage relative to the other supply voltage and the "Q" in the subscript indicates that the supply voltages are not necessarily the same as the supply voltages, $V_{DD}$ and $V_{SS}$, in the other parts of the integrated circuit. This allows the interior portions of the integrated circuit to operate at voltage levels, 0-+3.3V, while the peripheral output driver circuits operate at different levels, 0-+5.0V, for example. Furthermore, the separation of supply voltages provides for some insulation from noise between the interior and peripheral portions of the integrated circuit. The drains of the two transistors 50 and 51 are connected together and to an output terminal 54. The gates of the transistors 50 and 51 are also connected together to an input terminal 57 connected to the rest of the buffer circuit (not shown).

During the switching of output signals, the output signal voltages invariably tend to overshoot the $V_{DDQ}$ and $V_{SSQ}$ supply voltages due to an impedance mismatch between the driver transistors and the external load. When the output signal voltage, DATA OUT, is being driven high in response to an internal signal, dataout*, going low at the input terminal 57, for instance, the prior art design results in a parasitic diode 55, marked by dotted lines, becoming forward-biased when the overshoot exceeds 0.6 volts. The diode 55 is formed by the junction of the drain of the P-channel, pullup transistor 50 and the N-well holding the transistor, which is also connected to $V_{DDQ}$. This forward-biasing action results in the injection of positive charges, or holes, into the substrate which works against the on-chip substrate bias voltage generator. The amount of hole injection is a function of the severity of the overshoot, the number of output buffers, and the frequency of switching. If the substrate bias voltage generator is overwhelmed by excessive hole injection, functional failures or soft errors occur in the on-chip DRAM.

Figure 6B:
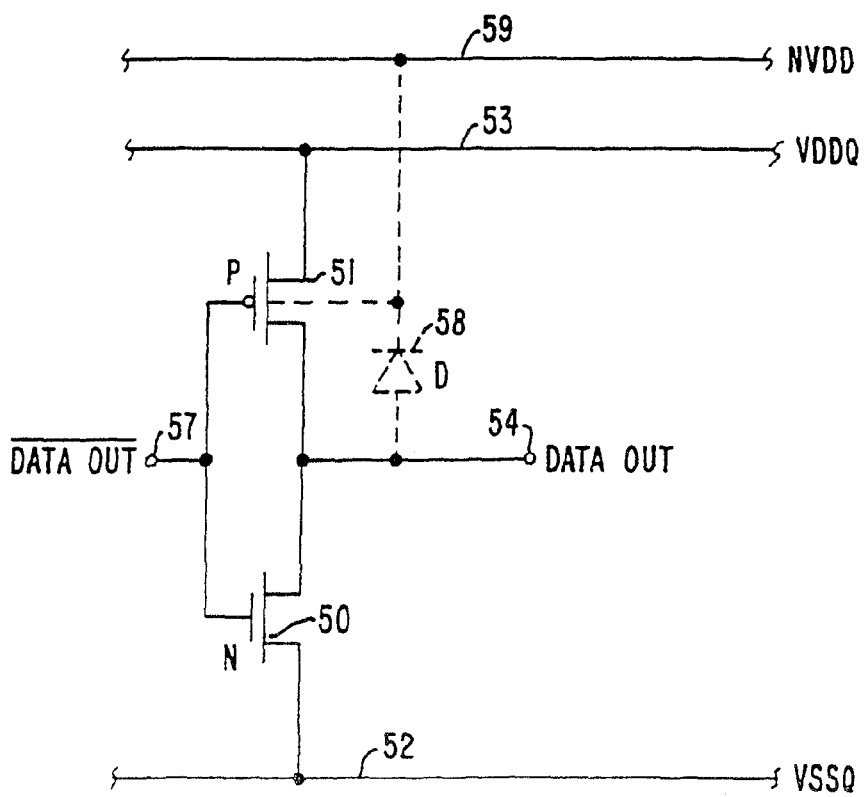
FIG. 6B is a circuit diagram of a CMOS driver stage of an output buffer according to the present invention.

To avoid this problem, a new output driver circuit, shown in FIG. 6B, is used. In the drawing, the same reference numerals are used where the operation or connection of the referenced element remains unchanged from FIG. 6A. Different reference numerals are used if the operation or connection of the element is different. In the new, representative driver circuit, for each bank of buffer circuits at particular $V_{DDQ}$ and $V_{SSQ}$ voltages, the N-wells in which the P-channel driver transistors 51 of the bank are located are raised to a voltage higher than the $V_{DDQ}$ voltage for the bank. An on-chip bias generator is connected to the $V_{DDQ}$ bus 53 for a reference to generate a voltage at $NV_{DD}$, 1 volt higher than $V_{DDQ}$. The bias generator (not shown) is connected to a bus 59 at $NV_{DD}$, which is connected to the N-wells of each of the P-channel transistors 51. If several P-channel transistors 51 are in a single N-well, the bus 59 is connected to the N-well in a series of taps, one located near each transistor 51. This arrangement lowers the possibility of latch-up.

For each bank of output buffers on the same integrated circuit, a different $NV_{DD}$ bias generator, referencing the $V_{DDQ}$ Supply for that bank, is used to generate the higher voltage. This allows the N-well(s) of an output buffer bank which is driven from a +3.3V supply to be biased at +4.3V, while an output buffer bank driven by a +5.0V supply, has its N-well(s) biased at +6.0V.

As shown in FIG. 6B, the parasitic diode 58 formed by the drain of the transistor 51 and the N-well holding the transistor 51 now has an extra 1 volt of N-well bias. The diode 58 does not become forward-biased unless the overshoot exceeds 1.6V. This extra margin of safety results in a greatly diminished level of hole injection into the substrate and thus prevents the occurrence of soft errors or functional failures in the on-chip DRAM.

Integrating the video memory, the DRAM 21, with a graphics controller results in significant power savings compared to present graphics controller systems with external DRAM. Capacitance in present graphics controller systems is comprised of the capacitance of the I/O pins of the DRAM packages and the controller package plus capacitance of the traces on the motherboard which carries and connects the DRAM and controller packages. The present invention has a roughly twenty-fold reduction of the video memory address, data and control bus capacitance. This results in an equivalent power savings since most of these lines are continuously switching at high frequencies.

Another source of power savings is the 128-bit wide memory word which can be transferred between the graphics engine 22 and the video memory 21. The controller, i.e., the graphics engine 22, has 128 bits of data available after one DRAM read cycle. In comparison, the graphics controller system in the prior art requires four or eight read cycles, depending upon a 32-bit or 16-bit wide DRAM organization, respectively. Since a fixed amount of power is consumed every DRAM cycle, the present invention has a savings of three-fourths to seven-eighths of the prior art power dissipation.

Furthermore, the present invention uses memory very efficiently. The capacity of the video memory 21 is not required to fall on high order binary boundaries, such as combinations of DRAM integrated circuits forming a memory of 32K×128 bits, or 64K×128 bits, the next larger size. In the present invention, the addition of memory blocks, with a typical size of 256K($2^{18}$) bits each, achieves the required capacity for the video memory 11. Memory capacity can be customized for a particular application. For example, a 1024×768×8 display requirement requires a video memory of 6.4 megabits, which can be built with 24 memory blocks. With external DRAMs, a video memory of 8 megabits is required since the standard DRAM package has 4 megabits. The video memory 21 of the integrated circuit 20 can be organized to be of any width, depth or capacity and need not follow the multiplexed addressing architecture associated with standard DRAMs.

Figure 7:
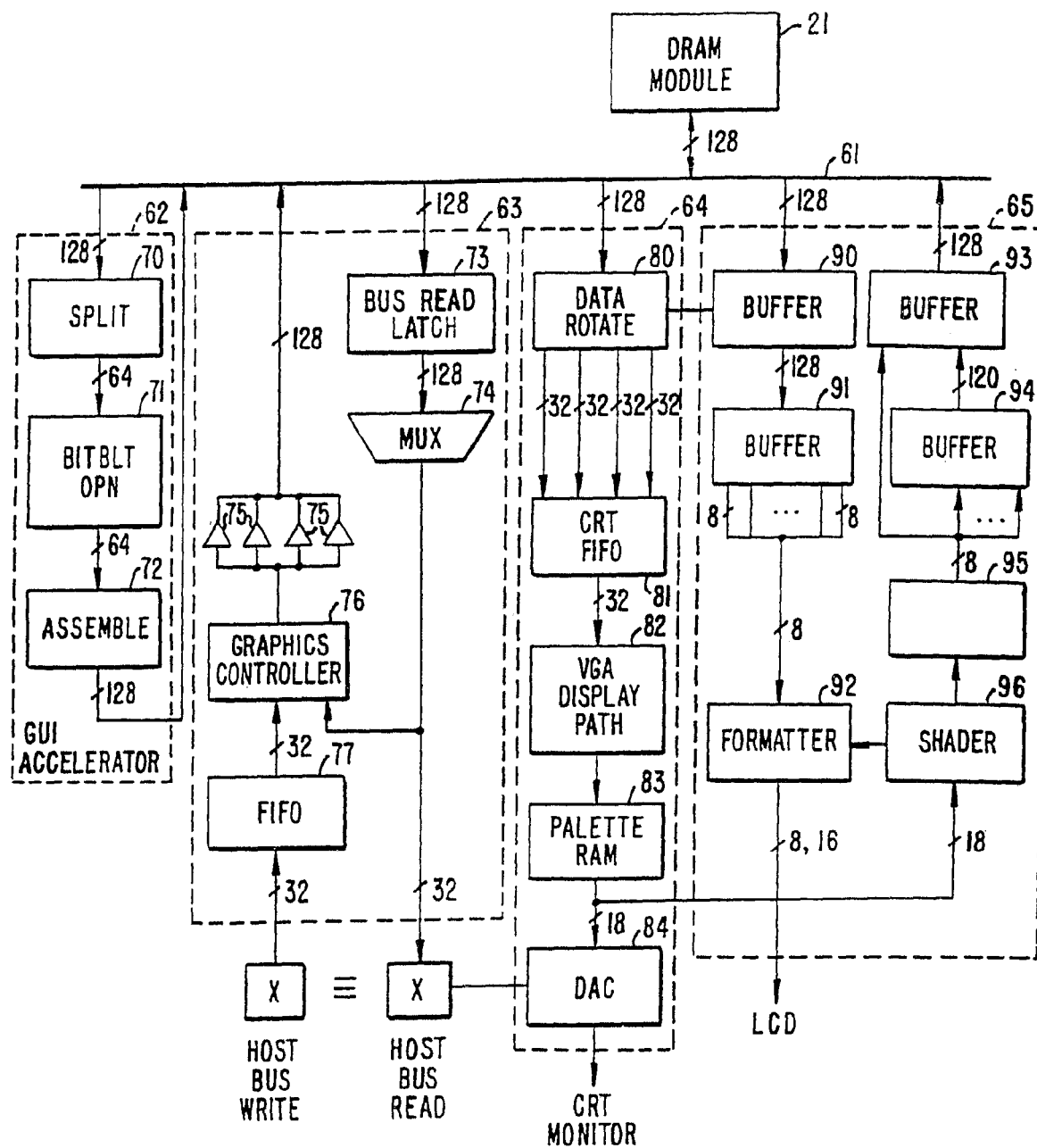
FIG. 7 is a block diagram detailing the organization of a graphics controller system according to the present invention.

With the ability to incorporate large amounts of logic and memory in a single integrated circuit, the present invention provides for a video memory and logic for graphics control operations in one integrated circuit. FIG. 7 illustrates the organization of the advanced graphics controller system of FIG. 2 in greater detail. As stated previously, the memory 21 is organized from dynamic RAM memory cells arranged 56K×128 bits wide. Stated differently in terms of memory blocks, the memory 21 has the storage capacity of 218×28 bits. The 128-bit interface 25 in FIG. 2 is realized by a 128-bit wide bus 61, organized as sixteen 8-bit bytes, so that a Write operation can be performed at the byte level into the memory 21. Connected to the bus 61 is a Graphics User Interface (GUI) Acceleration block 62, part of the Graphics Engine 22 of FIG. 2. The CPU Interface 23 of FIG. 2 is realized by a Host Bus Interface block 63 in FIG. 7, and the Display Interface 24 is by a CRT Display block 64 and an LCD Display Interface block 65. All the blocks 62–65 are indicated by dotted lines in FIG. 7. Not shown in FIG. 7 are the Infrared Interface 26, PCMCIA Host Adaptor 27 and the Video Source Interface 28. The circuits for the Interfaces 26 and 28, and Adaptor 27 are presently found in separate printed circuit boards in personal computer systems and may be integrated onto the single integrated circuit with the techniques described previously.

The GUI acceleration block 62 has a 128-bit wide register 70, which receives data from the bus 61. The register 70 splits its contents into two parts, 64-bits apiece, to a 64-bit BIT BLock Transfer (BITBLT) operation unit 71 for performing the operations. The output of the unit 71 is fed into an assemble register 72 on a 64-bit wide path. After a BITBLT operation, the register 72 builds up a 128-bit word for transfer back to the bus 61. This organization represents the best compromise between performance and space on the integrated circuit; the transfer rate is maximized between the memory 21 and the operation unit 71, yet an optimum size of 64 bits for the unit 71 is maintained. A 128-bit BITBLT operation unit occupies a very large amount of integrated circuit space, while a unit for 32 bits slows BITBLT operations too much.

The host bus interface block 63 lies between the bus of the host, i.e., the CPU of the computer system, and the bus 61. The interface block 63 provides a bidirectional data path between the 128-bit bus 61 and a 32-bit bus of the host. The block 63 has a Bus Read Latch 73 which holds a 128-bit wide word from the bus 61. The output of the latch 73 is connected to the input of a multiplexer 74, which selects 32 bits from the 128-bit latch 73 for the host bus. For host Read operations, the selected 32 bits should contain four consecutive bytes in the host bus address space. Depending upon the VGA-compatible format and other extended storage formats in use, these four bytes may be scattered among the 16 bytes, 16×8 bits equals 128 bits, of data stored in the latch 73.

Figure 8:
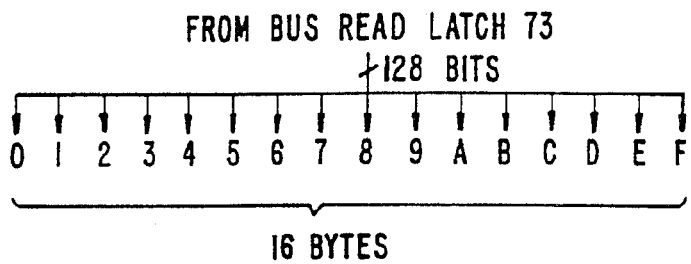
FIG. 8 illustrates the organization of the output signals of the Bus Read Latch of the graphics controller system of FIG. 7.
Figure 9A:
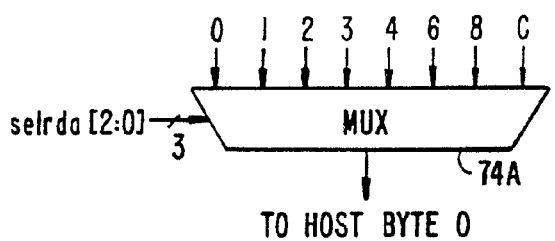
FIGS. 9A–9D illustrate the organization of the multiplexer at the output of the Bus Read Latch of the graphics controller system of FIG. 7.
Figure 9B:
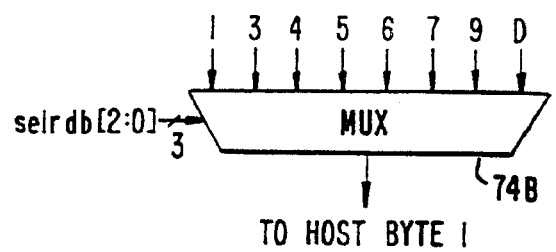
Figure 9C:
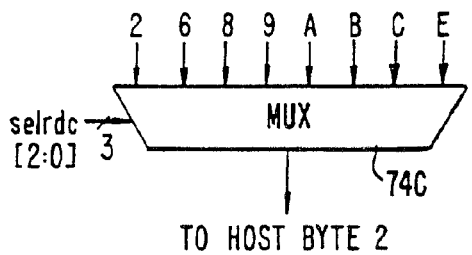
Figure 9D:
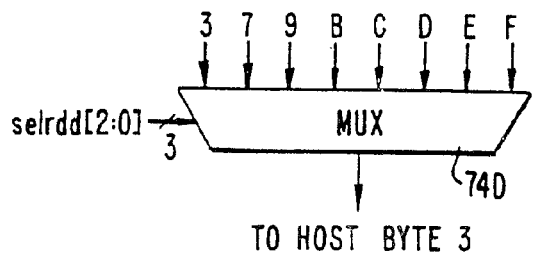

The output of the latch 73 is illustrated in FIG. 8 with each of the bytes labeled O-F. To implement 4-byte access properly for all VGA-compatible and additional extended storage formats, the multiplexer 74 is implemented as four separate single byte multiplexers 74A–74D, one for each byte read back upon the host bus. Each of the 8-to-1 multiplexers 74A–74D are illustrated in FIGS. 9A–9D respectively together with the particular input bytes from the latch 73. Each of the multiplexers 74A–74D respectively generates bytes 0–3 for the host bus.

The logic to generate the control signals, selda(2:0), seldb(2:0), seldc(2:0), and seldc(2:0), for the multiplexers 74A–74D is listed in VHDL code in TABLES 1 and 2. These control signals are derived from VGA standard control bits in programmable control registers which determine the storage format in use, and additional internal state information in the memory controller state machine. The present invention uses the following standard control bits:

SR4[3]=Chain-4
GR5[3]=Read Mode
GR5[4]=Odd/Even
GR4[0]=Read Map Select[0]
GR4[1]=Read Map Select[1]
GR6[0]=APA/Text*, Graphics Mode
and an extended mode control bit:
PACPIX=Packed Pixel Format

TABLE 1 tmp.sub.-- pack <= sr4.sub.-- 3 OR pacpix; - - chain4 or packed mode for read mode force pack mode for host write cyc(hwcyc),
read model (gr5.sub.-- 3) and memtst in addition to tmp.sub.-- pack.
pack <= tmp.sub.-- pack OR gr5.sub.-- 3 OR hwcyc OR mtest;
rdplanar <= NOT(pack OR gr5.sub.-- 4);
wrplanar <= NOT(tmp.sub.-- pack OR gr5.sub.-- 4);

As indicated in the code listed in TABLE 1, these control bits are used to generate control signals, tmp_pack, pack, rdplanar and wrplanar, which are used ultimately in generating the selda(2:0), seldb(2:0), seldc(2:0), and seldc(2:0) control signals. From these control signals, other control signals are generated for each of the multiplexers 74A–74D. For example, the control logic and signals for the first multiplexer 74A are illustrated in FIG. 2A. The control signals in TABLE 1 generate control signals sela(0)-sela(7). These eight control signals then generate the three selda control signals. The code in TABLE 2 shows how the multiplexer 74A responds to the control signals by selecting one of input eight bytes, mrd_dta(X DOWNTO Y), as the output byte, cpul0.

TABLE 2

```
first eight 8 to 1 mux (7:0)
sela(0) <= ((gr5.sub.-- 4 = `1` AND gr4(1) = `1` AND rmad(0) = `1`));
sela(1) <= ((rdplanar = `1` AND gr4 = "01"));
sela(2) <= ((rdplanar = `1` AND gr4 = "10") OR
    (gr5.sub.-- 4 = `1` AND gr4(1) = `1` AND rmad(0) = `0`));
sela(3) <= ((rdplanar = `1` AND gr4 = "11"));
sela(4) <= ((rdplanar = `1` AND gr4 = "00") OR
    (pack = `1` AND rmad = "00") OR
    (gr5.sub.-- 4 = `1` AND gr4(1) = `1` AND rmad(0) = `0`));
sela(5) <= ((pack = `1` AND rmad = "01") OR
    (gr5.sub.-- 4 = `1` AND gr4(1) = `0` AND rmad(0) = `1`));
sela(6) <= ((pack = `1` AND rmad = "10"));
sela(7) <= ((pack = `1` AND rmad = "11"));
PROCESS(sela)
BEGIN
CASE sela IS
WHEN "00000001" =>
    selrda <= "000";
WHEN "00000010" =>
    selrda <= "001";
WHEN "00000100" =>
    selrda <= "010";
WHEN "00001000" =>
    selrda <= "011";
WHEN "00010000" =>
    selrda 21 = "100";
WHEN "00100000" =>
    selrda <= "101";
WHEN "01000000" =>
    selrda <= "110";
WHEN OTHERS =>
    selrda <= "111";
END CASE;
END PROCESS;
PROCESS(selrda,mrd.sub.-- dta)
BEGIN
CASE selrda IS
WHEN "000" =>
    cpul0 <= mrd.sub.-- dta(79 DOWNTO 72);
WHEN "001" =>
```

TABLE 2-continued

```
            cpu10 <= mrd.sub.-- dta(119 DOWNTO 112);
      WHEN "010" =>
            cpu10 <= mrd.sub.-- dta(111 DOWNTO 104);
      WHEN "011" =>
            cpu10 <= mrd.sub.-- dta(103 DOWNTO 96);
      WHEN "100" =>
            cpu10 <= mrd.sub.-- dta(127 DOWNTO 120);
      WHEN "101" =>
            cpu10 <= mrd.sub.-- dta(95 DOWNTO 88);
      WHEN "110"=>
            cpu10 <= mrd.sub.-- dta(63 DOWNTO 56);
      WHEN OTHERS =>
            cpu10 <= mrd.sub.-- dta(31 DOWNTO 24);
      END CASE;
      END PROCESS;
      second eight 8 to 1 mux (15:8)
      selb(0) <= ((rdplanar = `1` AND gr4 = "00"));
      selb(1) <= ((rdplanar = `1` AND gr4 = "10"));
      selb(2) <= ((gr5.sub.-- 4 = `1` AND gr4(1) = `1` AND
      rmad(0) = `0` ));
      selb(3) <= (rg5.sub.-- 4 = `1` AND gr4(1) = `1` AND rmad(0) = `1` ));
      selb(4) <= ((pack = `1` AND rmad = "00") OR
              (gr5.sub.-- 4 = `1` AND gr4(1) = `0` AND rmad(0) = `0` ));
      selb(5) <= ((rdplanar = `1` AND gr4 = "01") OR
              (gr5.sub.-- 4 = `1` AND gr4(1) = `0` AND rmad(0) = `1` ) OR
              (pack = `1` AND rmad = "01"));
      selb(6) <= ((pack = `1` AND rmad = "10"));
      selb(7) <= ((pack = `1` AND rmad = "11"));
      PROCESS(selb)
      BEGIN
      CASE selb IS
      WHEN "00000001" =>
            selrdb <= "000";
      WHEN "00000010" =>
            selrdb <= "001";
      WHEN "00000100" =>
            selrdb <= "010";
      WHEN "00001000" =>
            selrdb <= "011";
      WHEN "00010000" =>
            selrdb <= "100";
      WHEN "00100000" =>
            selrdb <= "101";
      WHEN "01000000" =>
            selrdb <= "110";
      WHEN OTHERS =>
            selrdb <= "111";
      END CASE;
      END PROCESS;
      PROCESS(selrdb,mrd.sub. -- dta)
      BEGIN
      CASE selrdb IS
      WHEN "000" =>
            cpu11 <= mrd.sub.-- dta(95 DOWNTO 88);
      WHEN "001" =>
            cpu11 <= mrd.sub.-- dta(79 DOWNTO 72);
      WHEN "010" =>
            cpu11 <= mrd.sub.-- dta(103 DOWNTO 96);
      WHEN "011" =>
            cpu11 <= mrd.sub.-- dta(71 DOWNTO 64);
      WHEN "100" =>
            cpu11 <= mrd.sub.-- dta(119 DOWNTO 112);
      WHEN "100" =>
            cpu11 <= mrd.sub.-- dta(87 DOWNTO 80);
      WHEN "110" =>
            cpu11 <= mrd.sub.-- dta(55 DOWNTO 48);
      WHEN OTHERS =>
            cpu11 <= mrd.sub.-- dta(23 DOWNTO 16);
      END CASE;
      END PROCESS;
      third eight 8 to 1 mux (23:16)
      selc(0) <= ((gr5.sub.-- 4 = `1` AND gr4(1) = `0` AND
              rmad(0) = `0` ) OR (rdplanar = `1` AND gr4 = "00"));
      selc(1) <= ((rdplanar = `1` AND gr4 = "01"));
      selc(2) <= ((gr5.sub.-- 4 = `1` AND gr4(1) = `0` AND rmad(0) = `1` ));
      selc(3) <= ((rdplanar = `1` AND gr4 = "11"));
      selc(4) <= ((pack = `1` AND rmad = "00"));
      selc(5) <= ((pack = `1` AND rmad = "01"));
      selc(6) <= ((rdplanar = `1` AND gr4 = "10") OR
              (gr5.sub.-- 4 = `1` AND gr4(1) = `1` AND rmad(0) = `0` ) OR
              (pack = `1` AND rmad = "10"));
      selc(7) <= (gr5.sub.-- 4 = `1` AND gr4(1) = `1` AND rmad(0) = `1` ));
      PROCESS(selc)
      BEGIN
      CASE selc IS
      WHEN "00000001" =>
            selrdc <= "000";
      WHEN "00000010" =>
            selrdc <="001";
      WHEN "00000100" =>
            selrdc <= "010";
      WHEN "00001000" =>
            selrdc <= "011";
      WHEN "00010000" =>
            selrdc <= "100";
      WHEN "00100000" =>
            selrdc <= "101";
      WHEN "01000000" =>
            selrdc <= "110";
      WHEN OTHERS =>
            selrdc <= "111";
      END CASE;
      END PROCESS;
      PROCESS(selrdc,mrd.sub.-- dta)
      BEGIN
      CASE selrdc IS
      WHEN "000" =>
            cpu12 <=mrd.sub.-- dta(63 DOWNTO 56);
      WHEN "001" =>
            cpu12 <= mrd.sub.-- dta(55 DOWNTO 48);
      WHEN "010" =>
            cpu12 <= mrd.sub.-- dta(31 DOWNTO 24);
      WHEN "011" =>
            cpu12 <= mrd.sub.-- dta(39 DOWNTO 32);
      WHEN "100" =>
            cpu12 <= mrd.sub.-- dta(111 DOWNTO 104);
      WHEN "101" =>
            cpu12 <= mrd.sub.-- dta(79 DOWNTO 72);
      WHEN "110" =>
            cpu12 <= mrd.sub.-- dta(47 DOWNTO 40);
      WHEN OTHERS =>
            cpu12 <= mrd.sub.-- dta(15 DOWNTO 8);
      END CASE;
      END PROCESS;
      fourth eight 8 to 1 mux (31:24)
      seld(0) <= ((rdplanar = `1` AND gr4 = "00"));
      seld(1) <= ((rdplanar = `1` AND gr4 = "01") OR
              (gr5.sub.-- 4 = `1` AND gr4(1) = `0` AND rmad(0) = `1` ));
      seld(2) <= ((rdplanar = `1` AND gr4 = "10"));
      seld(3) <= ((gr5.sub.-- 4 = `1` AND gr4(1) = `0` AND
      rmad(0) = `0` ));
      seld(4) <= ((pack = `1` AND rmad = "00"));
      seld(5) <= ((pack = `1` AND rmad = "01"));
      seld(6) <= ((pack = `1` AND rmad = "10") OR
              (gr5.sub.-- 4 = `1` AND gr4(1) = `1` AND rmad(0) = `0` ));
      seld(7) <= ((pack = `1` AND rmad = "11") OR
              (gr5.sub.-- 4 = `1` AND gr4(1) = `1` AND rmad(0) = `1` )OR
              (rdplanar = `1` AND gr4 = "11"));
      PROCESS(seld)
      BEGIN
      CASE seld IS
      WHEN "00000001" =>
            selrdd <= "000";
      WHEN "00000010" =>
            selrdd <= "001";
      WHEN "00000100" =>
            selrdd <= "010";
      WHEN "00001000" =>
            selrdd <= "011";
      WHEN "00010000" =>
            selrdd <= "100";
      WHEN "00100000" =>
            selrdd <= "101";
      WHEN "01000000" =>
            selrdd <= "110";
      WHEN OTHERS =>
            selrdd <= "111";
      END CASE;
```

TABLE 2-continued

```
END PROCESS;
PROCESS(selrdd,mrd.sub.-- dta)
BEGIN
CASE selrdd IS
WHEN "000" =>
    cpu13 <= mrd.sub.-- dta(31 DOWNTO 24);
WHEN "001" =>
    cpu13 <= mrd.sub.-- dta(23 DOWNTO 16);
WHEN "010" =>
    cpu13 <= mrd.sub.-- dta(15 DOWNTO 8);
WHEN "011" =>
    cpu13 <= mrd.sub.-- dta(55 DOWNTO 48);
WHEN "100" =>
    cpu13 <= mrd.sub.-- dta(103 DOWNTO 96);
WHEN "101" =>
    cpu13 <= mrd.sub.-- dta(71 DOWNTO 64);
WHEN "110" =>
    cpu13 <= mrd.sub.-- dta(39 DOWNTO 32);
WHEN OTHERS =>
    cpu13 <= mrd.sub.-- dta(7 DOWNTO 0);
END CASE;
END PROCESS
```

The code in TABLE 2 similarly illustrates the details of the control signals and operation of the multiplexers 74B–74D respectively.

With reference to FIG. 7 once again, the block 63 also has a FIFO (First-In, First Out) register 77 which has its input terminals connected to the 32-bit host bus for transfer of data from the host bus. The output terminals of the FIFO 77, also 32 bits wide, are connected to a graphics controller unit 76, which also has its input terminals connected to the output terminals of the multiplexer 74. The graphics controller unit 76 manipulates data bits and can selectively load a single, or multiple, byte to the bus 61 through four drivers 75 in response to commands from the CPU (not shown). For VGA compatibility, the 32 bits sent from the Bus Read Latch 73 to the graphics controller unit 76 during a memory write operation are always be the four bytes from the four VGA planes containing the last byte read from the memory module 60 on the host bus. The multiplexer 74 is set properly in a VGA compatible mode upon completion of each Read operation. This setting for the multiplexer 74 is again dependent upon VGA or extended mode and is derived from logic equations similar to those shown in TABLES 1 and 2. The four drivers 75 reverse the data selection operation performed by the multiplexer 74. The multiplexer 74 selects four bytes out of the 16 bytes read from the memory 60 to forward to the host bus. The drivers 75 position the four bytes from the host bus in a write operation properly in the 16 byte slots on the memory bus 61 so that the data is stored properly for subsequent retrieval. Control of these drivers 75 is derived from the memory controller control states and control register bits that define the VGA-compatible storage format, or other additional extended storage format, in use.

The CRT display block 64 provides a data path between the memory 21 and the CRT display which is compatible with the VGA standard. The block 64 has a Data Rotate unit 80, which receives 128 bits from the bus 61. The unit 80 is connected over four 32-bit paths to the input terminals of a CRT FIFO register 81 which has a capacity of 4 words, each word 128 bits wide. Stated differently, the FIFO register 81 is 128 bits wide and four stages deep, and can be filled in four memory fetches. The output terminals of the FIFO register 81 are connected to a VGA Display Path unit 82 over a 32-bit wide path. All VGA compatible graphics controllers for notebook computers today are based on a 16-bit or 32-bit memory bus to an external video memory buffer. The present 128-bit bus architecture, in comparison, allows improved performance while reducing power consumption. However, to achieve VGA compatibility and improve performance, byte swapping is required in transferring data from the memory bus 61 to the FIFO register 81. This swapping is implemented in the Data Rotate unit 80. From the 128 bits of the FIFO register 81, 32 bits are selected and sent to the VGA Display Path unit 82. The code in TABLE 3 specifies the control signals and implementation in terms of the control register bits which define the VGA storage format or extended mode storage format in use, as well as the memory controller control states.

The control signals are:

fontcy is a signal derived from the internal state machine and indirectly from the previously identified control signal, GR6[0]; a control signal, such as fontcy, is found in present VGA compatible controllers to determine a font or ASCII fetch operation in text mode.

swap 0, swap 1 are the 0 and 1-order bits of the CRT address counters found in VGA compatible controllers; these signals are derived from the Chain-4 and Odd/Even control signals mentioned previously.

rscntb0, rscntb1 are the 0 and 1-order bits of the 5-bit row scan counter found in VGA compatible controllers; the row scan counter is used for tracking the rows of a character in text mode.

lword is the Chain-4, or SR4[3], control signal identified previously.

crsr_dtct is the cursor detect signal in VGA-compatible controllers; and

TEXT, apa are the true and inverted of the GR6[0] control signal previously identified.

TABLE 3

FIFO INPUT MUXING EQUATIONS:

```
swap0a <= (((not fontcy( and swap0) OR (fontcy AND rscntb0));
swap1a <= (((not fontcy) AND swap1) OR (fontcy AND rscntb1));
swap1b <= (((not fontcy) and (swap1 OR (not 1word))) OR
(fontcy AND rscntb1))
memc1.sub.-- dta <= (crsr.sub.-- dtct AND TEXT) OR
(mem.sub.-- dta(96) AND apa);
memc2.sub.-- dta <= crsr.sub.-- dtct AND TEXT) OR
(mem.sub.-- dta(32) AND apa);
mema.sub.-- dta (127 DOWNTO 96) <= mem.sub.-- dta(127 DOWNTO
97) & memc1.sub.-- dta;
mema.sub.-- dta (95 DOWNTO 64) <= mem.sub.-- dta(95 DOWNTO 64);
mema.sub.-- dta (63 DOWNTO 32) <= mem.sub.-- dta(63 DOWNTO
33) & memc2.sub.-- dta;
mema.sub.-- dta (31 DOWNTO 0) <= mem.sub.-- dta(31 DOWNTO 0);
swapa <= swap1a & swap0a;
swapb <= swap1b & swap0a;
```

These control signals are used to generate further signals, memcl_dta and memc2_dta. Stated generally, these two signals are either the crsr_dtct signal in text mode, or bit 96 (or bit 36 respectively) of the data bits from the 128-bit word on the bus 61 in graphics mode. The signals, mema_dta, are basically the four 32-bit words of data formed from the 128-bit word on the bus 61. The words for the bit locations, 127-96 and 63-32, are modified so that the bits 96 and 32 are either crsr_dtct in text mode or respectively data bits 96 and 32 from the bus 61. Finally, swapa and swapb are the control signals to the multiplexers in the Data Rotate unit 80. It should be noted that the symbol, "&", represents a concatenation of signals.

The code listed in TABLE 4 illustrates the operation of the Data Rotate unit 80, which receives the mema_dta signals as input and transmits crt_fin signals as output to the FIFO register 81. The first VGA (32-bit) word, crt_fin(31 DOWNTO 0), may be filled by any one of the four incoming 32-bit words from the bus 61, depending upon the state of control signals swapa. Similarly, the third VGA (32-bit) word, crt_fin(95 DOWNTO 64), may be filled by any one of the four incoming 32-bit words from the bus 61, depending upon the state of control signals swapb. The second and fourth VGA words, crt_fin(63 DOWNTO 32) and crt_fin (127 DOWNTO 96), are respectively filled by the third and first incoming 32-bit words from the bus 61.

TABLE 4

```
The firs set of mux corresponding to first VGA word in fifo.
CASE swapa IS
WHEN "00" =>
crt.sub.-- fin(31 DOWNTO 0) <= mema.sub.-- dta(127 DOWNTO 96);
WHEN "01" =>
crt.sub.-- fin(31 DOWNTO 0) <= mema.sub.-- dta(95 DOWNTO 64);
WHEN "10" =>
crt.sub.-- fin(31 DOWNTO 0) <= mema.sub.-- dta(63 DOWNTO 32);
WHEN OTHERS =>
crt.sub.-- fin(31 DOWNTO 0) <= mema.sub.-- dta(31 DOWNTO 0);
END CASE;
END PROCESS;
The second set of mux corresponding to third VGA word in fifo
CASE swapb IS
WHEN "00" =>
crt.sub.-- fin(95 DOWNTO 64) <= mema.sub.-- dta(127 DOWNTO 96);
WHEN "01" =>
crt.sub.-- fin(95 DOWNTO 64) <= mema.sub.-- dta(95 DOWNTO 64);
WHEN "10" =>
crt.sub.-- fin(95 DOWNTO 64) <= mema.sub.-- dta(63 DOWNTO 32);
WHEN OTHERS =>
crt.sub.-- fin(95 DOWNTO 64) <= mema.sub.-- dta(31 DOWNTO 0);
END CASE;
END PROCESS;
No muxes for second and fourth VGA group of data from memory to fifo
crt.sub.-- fin(63 DOWNTO 32) <= mem.sub.-- dta(95 DOWNTO 64);
crt.sub.-- fin(127 DOWNTO 96) <= mem.sub.-- dta(31 DOWNTO 0);
crt.sub.-- fin(127 downto 0) are the 128 data bits going into the crt fifo as input
```

The CRT FIFO 81 then selectively feeds 32-bit words into a VGA Display Path unit 82 and a Color Palette RAM 83. The RAM 83 is, in turn, connected to a digital-to-analog converter (DAC) 84. The RAM 83 feeds 18 bits of data, 6 bits for each component color, to the DAC 84. The DAC 84 generates the analog signals for a CRT color display.

The RAM 83 also feeds data into the LCD Display Interface block 65 which is organized for dual scan LCD panel displays. The general operation of the block 65 is that a Shader unit 96 receives the data from the RAM 83. The unit 96 generates the grayscale values for the LCD pixels. In passing, it should be noted that the word, grayscale, implies intensity for a color LCD display. These values are sent to a Formatter unit 92 which, as the name implies, formats the grayscale values for the integrated circuit(s) which drive the electrodes of the LCD display. The Shader unit 96 also sends its grayscale values through several buffer units 95, 94, 93, 90 and 91 (and along the bus 61) before being formatted and transmitted by the Formatter unit 92 for a dual scan operation. Dual scan LCD panels are commonly used today in notebook computers and the buffer units of the block 65 provide for the memory by which, in alternating operation, the display in one LCD panel is updated by the Shader unit 96 while the display in the second panel is maintained from memory.

Therefore, while the description above provides a full and complete disclosure of the preferred embodiments of the present invention, various modifications, alternate constructions and equivalents may be employed without departing from the true scope and spirit of the invention. For example, while the present invention has been described in terms of an integrated circuit with a memory capacity of some 7.3 megabits and some 40–50K logic gates, one could use the present invention to build an integrated circuit of reduced size. An integrated circuit having a memory capacity of 2 megabits, the capacity of basic VGA video memory in graphics cards, with 30K logic gates, the approximate amount of logic in present graphics controller integrated circuits, still realizes the advantages of the present invention. Costs, power dissipation and occupied space are reduced, and performance is enhanced, for instance. The present invention, therefore, should be limited only by the metes and bounds of the appended claims.

What is claimed is:

1. An integrated circuit comprising:
    a first dopant-type semiconductor substrate having a logic portion and a memory portion thereon, the logic portion having at least 30K logic gates and having a layout on the substrate that need not be constrained by the physical dimensions of the layout of the memory portion on the substrate, the memory portion coupled to the logic portion through a data interface, the memory portion having a capacity of at least 2 megabits and the data interface being at least 128 bits wide, and
    a capacitor having a first dopant-type transistor in a second dopant-type well in the first dopant-type semiconductor substrate, the first dopant-type transistor having a gate, first and second source/drains, the first source/drain connected in common to the second source/drain to form a first terminal of the capacitor, the gate forming a second terminal of the capacitor, the second dopant-type well connected to a first voltage supply line, and the substrate connected to a second voltage supply line, different voltages applied to the first voltage supply line and to the second voltage supply line, such that the semiconductor junction between the second dopant-type well and the substrate is reverse-biased; whereby the capacitor is isolated from electrical noise in the substrate.

2. The integrated circuit of claim 1, further comprising a voltage supply supplying voltage to the second voltage supply line, the voltage supply comprising a substrate bias generator.

3. The integrated circuit of claim 1, wherein the first dopant-type transistor comprises a PMOS transistor, the second dopant-type well comprises an N-well, the first dopant-type semiconductor substrate comprises a P-type substrate and the voltage applied to the P-type substrate by the second voltage supply line is negative with respect to the voltage applied to the N-well.

4. The integrated circuit of claim 3, further comprising a voltage supply supplying voltage to the second voltage supply line, the voltage supply comprising a substrate bias generator.

5. The integrated circuit of claim 1, wherein the logic portion has at least 40K logic gates; and the memory portion has a capacity of at least 7.3 megabits.

6. The integrated circuit of claim 5, further comprising a voltage supply supplying voltage to the second voltage supply line, the voltage supply comprising a substrate bias generator.

7. The integrated circuit of claim 5, wherein the first dopant-type transistor comprises a PMOS transistor, the second dopant-type well comprises an N-well, the first dopant-type semiconductor substrate comprises a P-type substrate and the voltage applied to the P-type substrate by the second voltage supply line is negative with respect to the voltage applied to the N-well.

8. The integrated circuit of claim 7, further comprising a voltage supply supplying voltage to the second voltage supply line, the voltage supply comprising a substrate bias generator.

9. An integrated circuit comprising:
a first dopant-type semiconductor substrate having a logic portion and a memory portion thereon, the logic portion having at least 30K logic gates and a layout on the substrate that need not be constrained by the physical dimensions of the layout of the memory portion on the substrate, the memory portion coupled to the logic portion through a data interface, the memory portion having a capacity of at least 2 megabits and the data interface being at least 128 bits wide, and
an analog circuit having a capacitor, the capacitor comprising a first dopant-type transistor in a second dopant-type well in the first dopant-type semiconductor substrate, the first dopant-type transistor having a gate, first and second source/drains, the first source/drain connected in common to the second source/drain to form a first terminal of the capacitor, the gate forming a second terminal of the capacitor, the second dopant-type well connected to a first voltage supply line, and the substrate connected to a second voltage supply line, different voltages applied to the first voltage supply line and to the second voltage supply line, such that the semiconductor junction between the second dopant-type well and the substrate is reverse-biased; whereby the capacitor is isolated from electrical noise in the substrate.

10. The integrated circuit of claim 9, further comprising a voltage supply supplying voltage to the second voltage supply line, the voltage supply comprising a substrate bias generator.

11. The integrated circuit of claim 9, wherein the first dopant-type transistor comprises a PMOS transistor, the second dopant-type well comprises an N-well, the first dopant-type semiconductor substrate comprises a P-type substrate and the voltage applied to the P-type substrate by the second voltage supply line is negative with respect to the voltage applied to the N-well.

12. The integrated circuit of claim 11, further comprising a voltage supply supplying voltage to the second voltage supply line, the voltage supply comprising a substrate bias generator.

13. The integrated circuit of claim 9, wherein the logic portion has at least 40K logic gates; and the memory portion has a capacity of at least 7.3 megabits.

14. The integrated circuit of claim 13, further comprising a voltage supply supplying voltage to the second voltage supply line, the voltage supply comprising a substrate bias generator.

15. The integrated circuit of claim 13, wherein the first dopant-type transistor comprises a PMOS transistor, the second dopant-type well comprises an N-well, the first dopant-type semiconductor substrate comprises a P-type substrate and the voltage applied to the P-type substrate by the second voltage supply line is negative with respect to the voltage applied to the N-well.

16. The integrated circuit of claim 15, further comprising a voltage supply supplying voltage to the second voltage supply line, the voltage supply comprising a substrate bias generator.

17. A complementary MOS integrated circuit, containing NMOS transistors and PMOS transistors on a semiconductor substrate, comprising:
circuitry for processing data associated with graphics information for display by an electronic system in which the complementary MOS integrated circuit resides, the circuitry including at least 30K logic gates in a layout on the substrate;
a memory for storing and retrieving at least a portion of data associated with the graphics information for display by the electronic system in which the complementary MOS integrated circuit resides, the memory having a capacity of at least 2 megabits in a layout on the substrate, the circuitry for processing data having a layout on the substrate that need not be constrained by the physical dimensions of the layout of the memory portion on the substrate; and
a data interface between the circuitry and the memory, the data interface being at least 128 bits wide;
whereby integration of the circuitry, the memory and the data interface in the complementary MOS integrated circuit results in a lower number of integrated circuit packages, and lower power dissipation, in the electronic system in which the complementary MOS integrated circuit resides.

18. The complementary MOS integrated circuit of claim 17, in which the circuitry, the memory and the data interface are configured in such a way as to communicate with a CPU.

19. The complementary MOS integrated circuit of claim 17, in which the circuitry, the memory and the data interface are configured in such a way as to communicate with a CPU through a CPU interface.

20. The complementary MOS integrated circuit of claim 17, in which the circuitry contains analog circuits.

21. The complementary MOS integrated circuit of claim 20, in which the circuitry, the memory and the data interface are configured in such a way as to communicate with a CPU.

22. The complementary MOS integrated circuit of claim 20, in which the circuitry, the memory and the data interface are configured in such a way as to communicate with a CPU through a CPU interface.

23. The complementary MOS integrated circuit of claim 17, wherein the logic portion has at least 40K logic gates and the memory portion has a capacity of at least 7.3 megabits.

24. The complementary MOS integrated circuit of claim 23, in which the circuitry, the memory and the data interface are configured in such a way as to communicate with a CPU.

25. The complementary MOS integrated circuit of claim 23, in which the circuitry, the memory and the data interface are configured in such a way as to communicate with a CPU through a CPU interface.

26. The complementary MOS integrated circuit of claim 23, in which the circuitry contains analog circuits.

27. The complementary MOS integrated circuit of claim 26, in which the circuitry, the memory and the data interface are configured in such a way as to communicate with a CPU.

28. The complementary MOS integrated circuit of claim 26 in which the circuitry, the memory and the data interface are configured in such a way as to communicate with a CPU through a CPU interface.

29. A complementary MOS integrated circuit, containing NMOS transistors and PMOS transistors on a semiconductor substrate, comprising:

circuitry for processing, controlling or manipulating video data for display by an electronic system in which the complementary MOS integrated circuit resides, the circuitry including at least 30K logic gates in a layout on the substrate;

a memory for storing and retrieving at least a portion of the video data for display by the electronic system in which the complementary MOS integrated circuit resides, the memory having a capacity of at least 2 megabits in a layout on the substrate; and a data interface between the circuitry and the memory, the data interface being at least 128 bits wide in a layout on the substrate, and wherein the layout on the substrate for the circuitry for processing, controlling or manipulating video data need not be constrained by the physical dimensions of the layout of the memory on the substrate;

whereby integration of the circuitry, the memory and the data interface in the complementary MOS integrated circuit results in a lower number of integrated circuit packages, and lower power dissipation, in the electronic system in which the complementary MOS integrated circuit resides.

30. The complementary MOS integrated circuit of claim 29, in which the circuitry, the memory and the data interface are configured in such a way as to communicate with a CPU.

31. The complementary MOS integrated circuit of claim 29, in which the circuitry, the memory and the data interface are configured in such a way as to communicate with a CPU through a CPU interface.

32. The complementary MOS integrated circuit of claim 29, in which the circuitry contains analog circuits.

33. The complementary MOS integrated circuit of claim 32, in which the circuitry, the memory and the data interface are configured in such a way as to communicate with a CPU.

34. The complementary MOS integrated circuit of claim 32, in which the circuitry, the memory and the data interface are configured in such a way as to communicate with a CPU through a CPU interface.

35. The complementary MOS integrated circuit of claim 29, wherein the logic portion has at least 29K logic gates and the memory portion has a capacity of at least 7.3 megabits.

36. The complementary MOS integrated circuit of claim 35, in which the circuitry, the memory and the data interface are configured in such a way as to communicate with a CPU.

37. The complementary MOS integrated circuit of claim 35, in which the circuitry, the memory and the data interface are configured in such a way as to communicate with a CPU through a CPU interface.

38. The complementary MOS integrated circuit of claim 35, in which the circuitry contains analog circuits.

39. The complementary MOS integrated circuit of claim 38, in which the circuitry, the memory and the data interface are configured in such a way as to communicate with a CPU.

40. The complementary MOS integrated circuit of claim 38, in which the circuitry, the memory and the data interface are configured in such a way as to communicate with a CPU through a CPU interface.

* * * * *

UNITED STATES PATENT AND TRADEMARK OFFICE
CERTIFICATE OF CORRECTION

PATENT NO. : 7,106,619 B2
APPLICATION NO. : 10/908259
DATED : September 12, 2006
INVENTOR(S) : Deepraj S. Puar et al.

It is certified that error appears in the above-identified patent and that said Letters Patent is hereby corrected as shown below:

| Column, Line | Reads | Should Read |
|---|---|---|
| Page 2, Foreign Patent Documents | "GB 0 269 049 1/1994" | --GB 2 269 049 1/1994-- |

Signed and Sealed this
Thirteenth Day of September, 2011

David J. Kappos
*Director of the United States Patent and Trademark Office*